US008468153B2

(12) United States Patent
Truvé et al.

(10) Patent No.: US 8,468,153 B2
(45) Date of Patent: Jun. 18, 2013

(54) INFORMATION SERVICE FOR FACTS EXTRACTED FROM DIFFERING SOURCES ON A WIDE AREA NETWORK

(75) Inventors: Staffan Truvé, Alingsås (SE); Christopher Ahlberg, Watertown, MA (US)

(73) Assignee: Recorded Future, Inc., Cambridge, MA (US)

( * ) Notice: Subject to any disclaimer, the term of this patent is extended or adjusted under 35 U.S.C. 154(b) by 0 days.

(21) Appl. No.: 12/691,687

(22) Filed: Jan. 21, 2010

(65) Prior Publication Data

US 2010/0299324 A1 Nov. 25, 2010

Related U.S. Application Data

(60) Provisional application No. 61/205,567, filed on Jan. 21, 2009.

(51) Int. Cl.
*G06F 7/00* (2006.01)
*G06F 17/30* (2006.01)

(52) U.S. Cl.
USPC .......................................................... 707/723

(58) Field of Classification Search
USPC ........................................ 707/723, 751, 943
See application file for complete search history.

(56) References Cited

U.S. PATENT DOCUMENTS

| 6,473,084 | B1 | 10/2002 | Phillips et al. |
| 7,363,243 | B2* | 4/2008 | Arnett et al. ................. 705/7.31 |
| 7,454,430 | B1 | 11/2008 | Komissarchik et al. |
| 7,502,789 | B2* | 3/2009 | Yao et al. ............................... 1/1 |
| 7,570,262 | B2 | 8/2009 | Landau et al. |
| 7,668,813 | B2* | 2/2010 | Baeza-Yates ................. 707/769 |
| 7,844,483 | B2* | 11/2010 | Arnett et al. ................. 705/7.31 |
| 7,849,079 | B2* | 12/2010 | Chandrasekar et al. ...... 707/723 |
| 2003/0135445 | A1* | 7/2003 | Herz et al. ...................... 705/37 |
| 2005/0060312 | A1* | 3/2005 | Curtiss et al. ..................... 707/7 |
| 2005/0234877 | A1* | 10/2005 | Yu ..................................... 707/3 |
| 2007/0094219 | A1* | 4/2007 | Kipersztok ..................... 706/52 |
| 2007/0143300 | A1* | 6/2007 | Gulli et al. ..................... 707/10 |
| 2007/0150335 | A1* | 6/2007 | Arnett et al. ..................... 705/10 |
| 2007/0162850 | A1 | 7/2007 | Adler et al. |
| 2007/0198503 | A1* | 8/2007 | Hogue et al. ...................... 707/5 |
| 2008/0086363 | A1* | 4/2008 | Kass et al. ...................... 705/10 |
| 2008/0215546 | A1* | 9/2008 | Baum et al. ....................... 707/3 |
| 2009/0030899 | A1* | 1/2009 | Tareen et al. ...................... 707/5 |
| 2009/0048927 | A1* | 2/2009 | Gross .............................. 705/14 |
| 2009/0049038 | A1* | 2/2009 | Gross ............................... 707/5 |
| 2009/0049041 | A1* | 2/2009 | Tareen et al. ..................... 707/5 |
| 2009/0132689 | A1* | 5/2009 | Zaltzman et al. ............. 709/223 |
| 2009/0157667 | A1* | 6/2009 | Brougher et al. ................ 707/5 |

* cited by examiner

*Primary Examiner* — Jeffrey A Burke
(74) *Attorney, Agent, or Firm* — Kristofer E. Elbing

(57) ABSTRACT

In one general aspect, a wide area network fact information service method is disclosed. This method includes storing a plurality of canonical fact entries, storing one or more fact descriptor entries for each of the canonical fact entries, and ranking the canonical fact entries relative to each other based on the descriptor entries.

22 Claims, 11 Drawing Sheets

# INFORMATION SERVICE FOR FACTS EXTRACTED FROM DIFFERING SOURCES ON A WIDE AREA NETWORK

CROSS-REFERENCE TO RELATED APPLICATION

This patent application claims the benefit of provisional application 61/205,567, filed on Jan. 21, 2009, which is herein incorporated by reference. This patent application also relates to the subject matter of U.S. provisional application No. 60/940,643, filed on May 29, 2007, U.S. provisional application No. 61/068,967, filed on Mar. 11, 2008, and U.S. patent application Ser. No. 12/156,455, filed on May 29, 2008, which are all herein incorporated by reference.

FIELD OF THE INVENTION

This application relates to information services, such as information services for facts extracted from content meaning across differing sources on a wide area network. Content meaning can be derived through linguistic analysis, metadata, or other approaches.

BACKGROUND OF THE INVENTION

Many approaches for extracting and using information from large networking environments, such as the Internet, have been proposed and implemented. Search engines and manually generated indexes are among the most common tools used for this purpose today, but there are literally hundreds of other specialized and/or complex data mining techniques that have been developed. And a large amount of effort is constantly being expended to improve and reengineer existing approaches as well as to develop new ones.

SUMMARY OF THE INVENTION

In one general aspect, the invention features a wide area network fact information service method that includes storing a plurality of canonical fact entries storing one or more fact descriptor entries for each of the canonical fact entries, and ranking the canonical fact entries relative to each other based on the descriptor entries.

In preferred embodiments, the step of ranking can be a continuous process that recalculates the rank of canonical fact entries based on new descriptor entries. The step of ranking cam be an iterative process that recalculates the rank of canonical fact entries based on new descriptor entries. The step of ranking can be a parallel process that recalculates the rank of canonical fact entries based on new descriptor entries. The ranking can be based on a predetermined ranking for entities associated with the canonical fact entries. The entity ranking can be based on a number of descriptor entries. The entity ranking can be based on a number of descriptor entries within a category. The entity ranking can be based on a sentiment/attitude value. The entity ranking can be based on co-occurrence with other facts and their rankings. The ranking can be based on a ranking of source credibility for data source providers associated with the descriptor entries. A same source provider can have different credibility values for different sources that it provides. A same source provider can have different credibility values for different categories of sources that it provides. The credibility ranking can be based on at least one user interest measure. The ranking can be based on a proximity measure for the descriptor entries. The proximity measure can be a temporal proximity measure. Proximity measures can be combined using a fading factor. The ranking can be based on a plurality of similarity measures that express a similarity between the canonical fact entries and/or fact descriptor entries. The similarity measures can relate to fact type and temporal overlap. The similarity measures can operate according to a hierarchy. The ranking can be based on publication times.

In another general aspect, the invention features a wide area network fact information service system that includes canonical fact entry storage, fact descriptor entry storage for storing one or more fact descriptor entries for each of the canonical fact entries, and a ranker for ranking the canonical fact entries relative to each other based on the descriptor entries.

In a further general aspect, the invention features a wide area network fact information service system that includes means for storing a plurality of canonical fact entries, means for storing one or more fact descriptor entries for each of the canonical fact entries, and means for ranking the canonical fact entries relative to each other based on the descriptor entries.

Systems according to the invention can be beneficial in that they can allow users to approach temporal information about facts in new and powerful ways, enabling them to search, analyze, and trigger external events based on complicated relationships in their past, present, and future temporal characteristics.

DETAILED DESCRIPTION OF AN ILLUSTRATIVE EMBODIMENT

Figure 1:
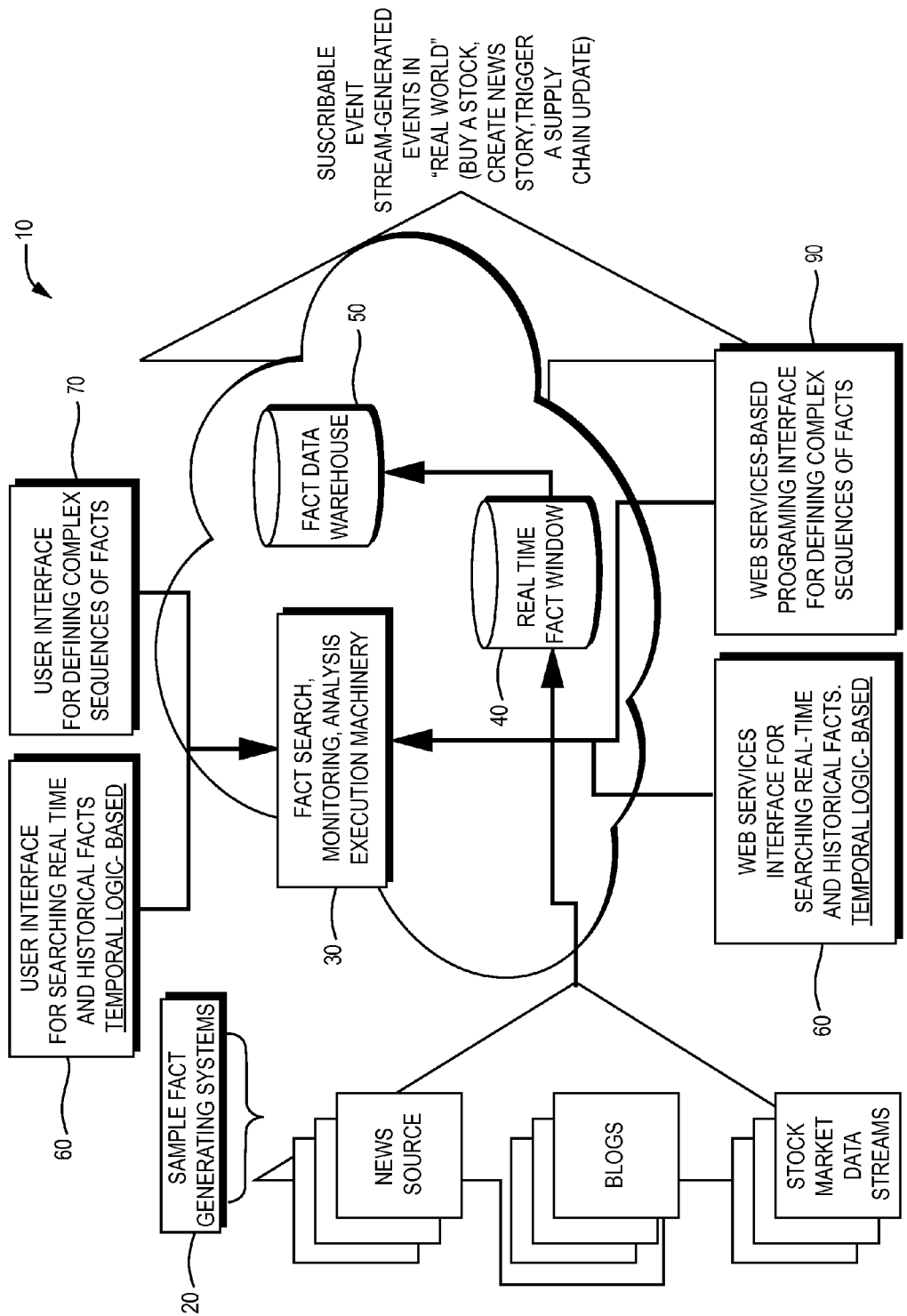
FIG. 1 shows a conceptual block diagram for an illustrative system according to the invention.

Referring to FIG. 1 an illustrative embodiment of a system 10 according to the invention can include one or more sources 20 of information about facts. In the case of the Internet, the information about facts can be retrieved from a wide variety of sources, such as news feeds, newspapers and magazines, blogs, websites, corporate calendars, political calendars, weather, sensor data, and stock market data streams. These are, of course, only examples of the types of data sources that can be used, and the concepts and principles presented in connection with the invention can be applied to other types of data sources, such as private networks, government data services, or enterprise/industrial automation tools.

The system 10 can also include research, monitoring, analysis, and execution machinery 30, which is responsive to the information sources 20. This part of the system can cooperate with a fact data warehouse 50, as well as several external interfaces. A data cache 40 can also be provided to speed up data retrieval in certain circumstances.

The external interfaces include a user interface, which is temporal logic based, for searching historical, present, and future facts 60, and a user interface for defining complex sequences of facts 70. The external interfaces also include a Web services interface, which is temporal logic based, for searching historical, present, and future facts 80, and a Web services-based programming interface for defining complex sequences of facts 90. The system 10 can also generate a "subscribable" fact stream for generated facts in the "real world" (e.g., buying a stock, creating a news story, triggering a supply chain update).

Facts are pieces of information about occurrences that can take place anywhere and can then be described, reported, or otherwise manifested or revealed in some form on a computer network. A sports feed can report facts for a game, for example, such as by updating a score tally. A sports blog can also focus on different facts from the same game and/or can describe the same facts from the same game in different ways.

The facts themselves can also be network-based. In the case of an electronic corporate securities filing, for example, the occurrence on the network of the filing itself can be a fact. And it can also act as a source of descriptive material for facts that it describes, such as a company's product release dates.

The existence of facts and information about them are typically acquired by applying software such as entity and event extractors to text documents/sources. One approach to extraction is to linguistically analyze plain text, such as through the use of services from Reuters, ClearForest, InXight, and/or Attensity. Extraction can also involve simple harvesting where the content already contains meta-data, such as Resource Description Framework (RDF) tags.

If, for example, an article includes the following sentence:

"Fort Orange financial completes $3.3M stock offering." the system can use linguistic analysis to map the document date to the investment fact. Note that in some circumstances, techniques amounting to less-than-perfect linguistic analysis, such as entity-verb clustering, can be used without excessive loss of performance.

In another example, an article includes the following sentence:

"Look for a barrage of shareholder lawsuits against Yahoo next week"
In this case, the system can map the lawsuit fact to a "next week" timepoint (a scheduled future fact).

Future facts can be scheduled facts, such as the expected Yahoo lawsuits or events extracted from an Internet calendar. They can also be predicted based on a variety of prediction methods. These can range from complex statistical forecasting methods to simple inferences, such as where a company's next annual meeting is predicted to be on the same day as all of its past annual meetings.

Figure 2:
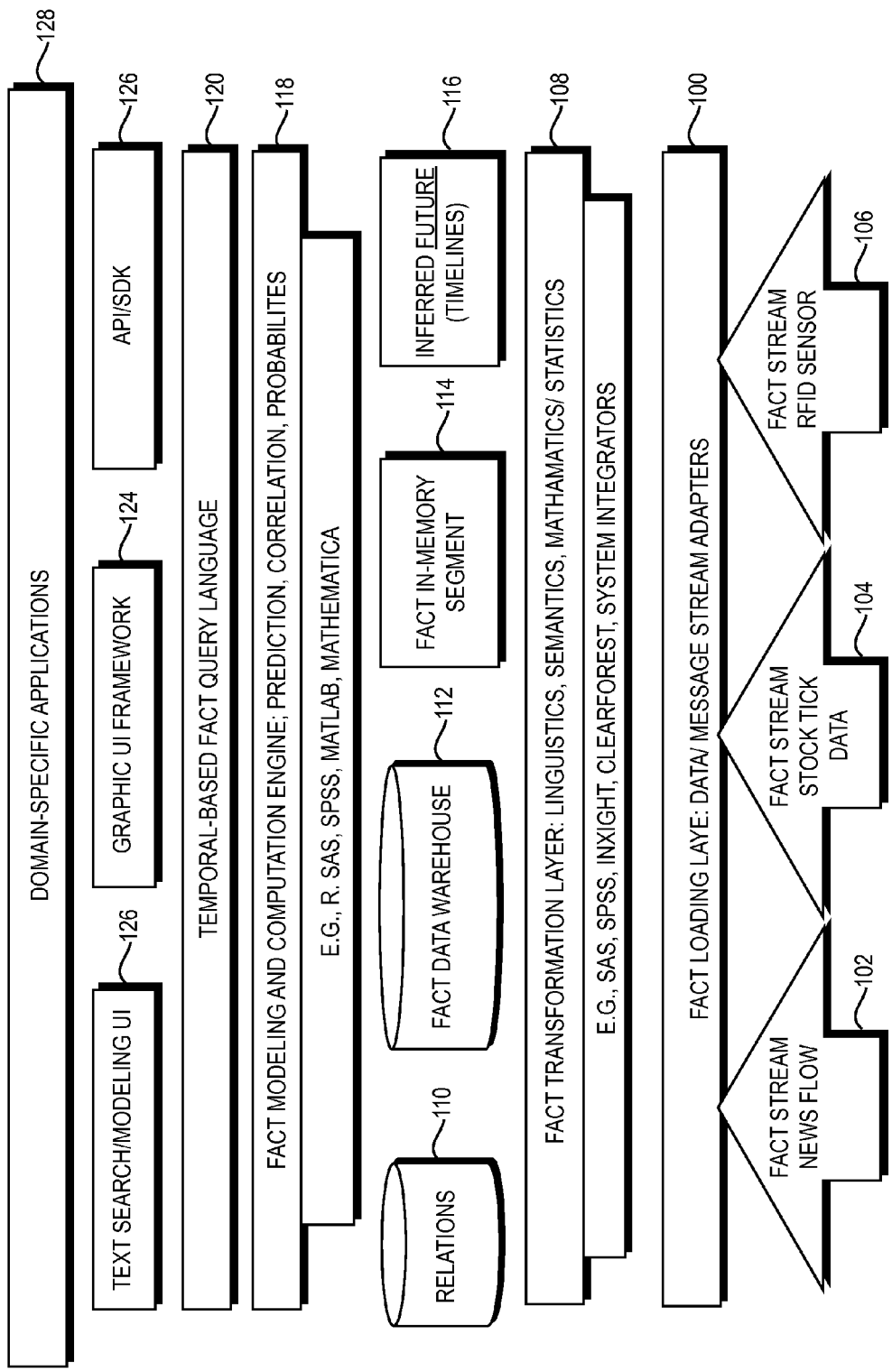
FIG. 2 shows a layer-based model for systems according to the invention.

Referring to FIG. 2, a system according to the invention can be organized according to a layered model. At the lowest level is a fact loading layer 100 that includes data/message stream and adapters. These receive data and/or message streams, such as news flow fact streams 102, stock tick data fact streams 104, and/or RFID sensor fact streams 106.

Above the fact loading layer 100 is a fact transformation layer 108, which can operate based on linguistics, semantics, and/or mathematics/statistics. Above the fact transformation layer is relations storage 110, a fact data warehouse 112, and fact in-memory segment 114 (cache), and an inverted future (timelines) module 116. At the next level is a fact modeling and computation engine 118, which can work with prediction, correlation, and probabilities. Layered above the fact modeling and computation engine is a temporal-based fact query language 120. A text search/modeling user interface 122, a graphical user interface framework 124, and an application programming interface/software development kit 126 are all layered over the temporal-based fact query language. Domain-specific applications 128 are in turn layered above these modules.

Figure 3:
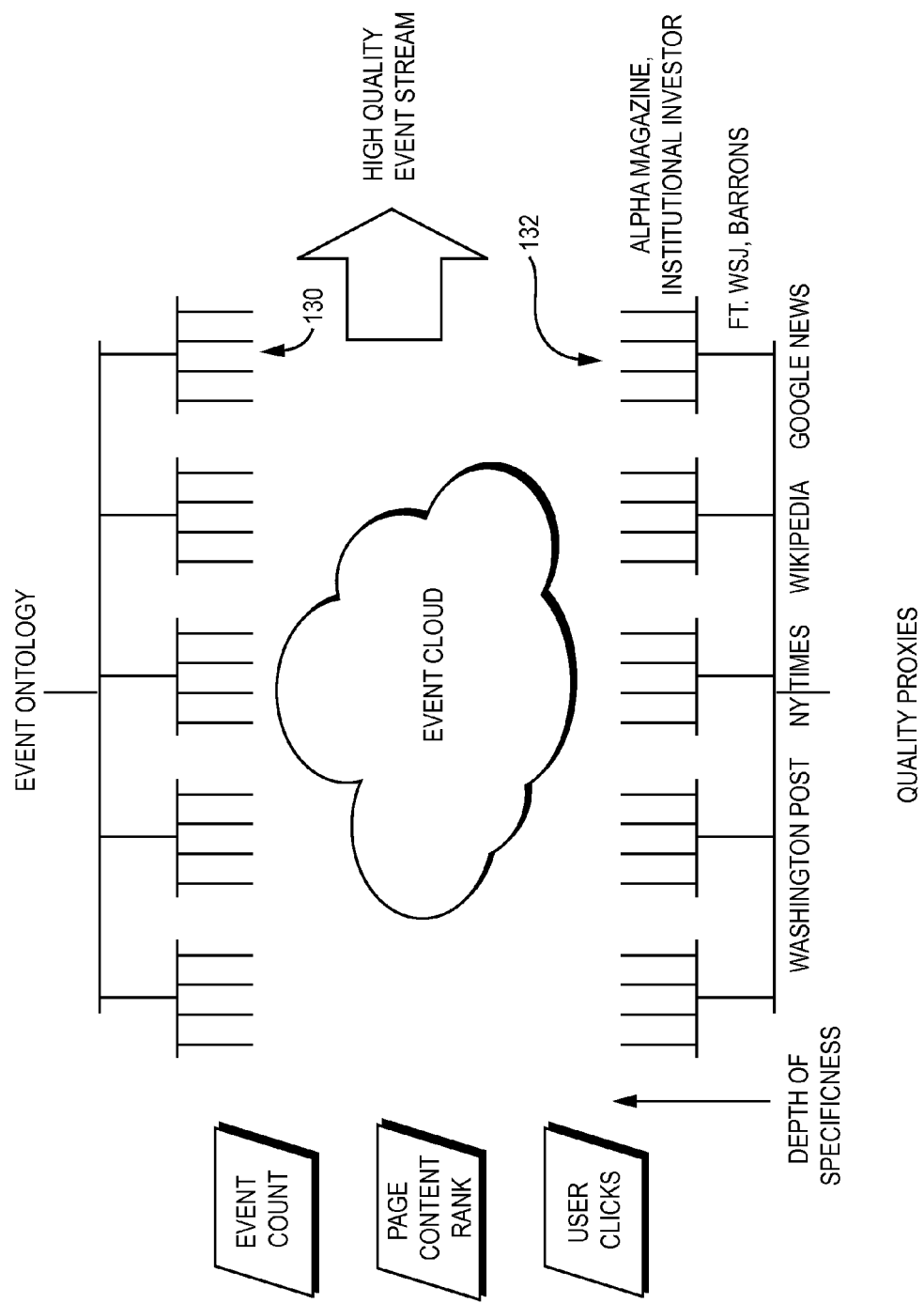
FIG. 3 shows a block diagram of an embodiment of an illustrative system. According to the invention.

Examples of domain-specific applications can include:
a dynamic yearbook generator for Facebook that shows who dated who.
an inference/correlation generated newspaper
inference/correlation generated market data
inference/correlation generated "most wanted Referring to FIG. 3, the system can be based on fact ontology 130 that categorizes facts into categories and subcategories, such as financial information and types of financial transactions, and a source ontology 132 that categorizes sources. The system also maintains fact counts, page context rank, and user click counts to be used in qualifying fact information. These are used to categorize and rank facts and information about facts. A newspaper article from a reputable newspaper, for example, will be ranked higher than an unknown blog entry for the same facts and/or entities. The categorization of facts and information about facts is similarly used to determine the relevance of a database entry to a service request, such as a search query. The overall ranking in relation to the service request will determine which database entries are selected and in what order they are presented to the user.

The system can present its results to the user in a variety of formats. It can present them in a simple hit list-based result output, similar to that of a traditional search engine, or it can use a temporally oriented format, such as a timeline. It can also use any other suitable user-oriented or machine-oriented format, such as more elaborate graphical user interfaces, RSS feeds, e-mail alerts, XML documents, or proprietary binary formats. Advertising can be associated with results, and this advertising can be targeted based on the specific facts and/or entities involved.

The system can provide a variety of types of services. A fact-based searching system can be provided for use by the general public or a specific segment. Fully customized, minimally filtered, or even raw fact feed subscriptions can also be provided. And more quantitative searching solutions could be provided, as well, such as for financial services applications.

One type of service is a news service. The service receives a user profile, which allows a user to specify interests. Information about facts relevant to these interests can then be provided to the user in a variety of formats, such as feeds, or an electronic newspaper format.

Mapping facts to temporal information in the database allows the system to answer questions that may be difficult to answer with traditional search engines. Here are some examples:
What will the pollen situation be in Boston next week?
Will terminal five be open next month?
What's happening in New York City this week?
When will movie X be released?
When is the next SARS conference?
When is Pfizer issuing debt next?
Where Will George Bush be next week?

Systems according to the invention can also answer more complex questions about the relationship between facts, such as "what happened to similar entities in similar chains of events?"

Figure 4:
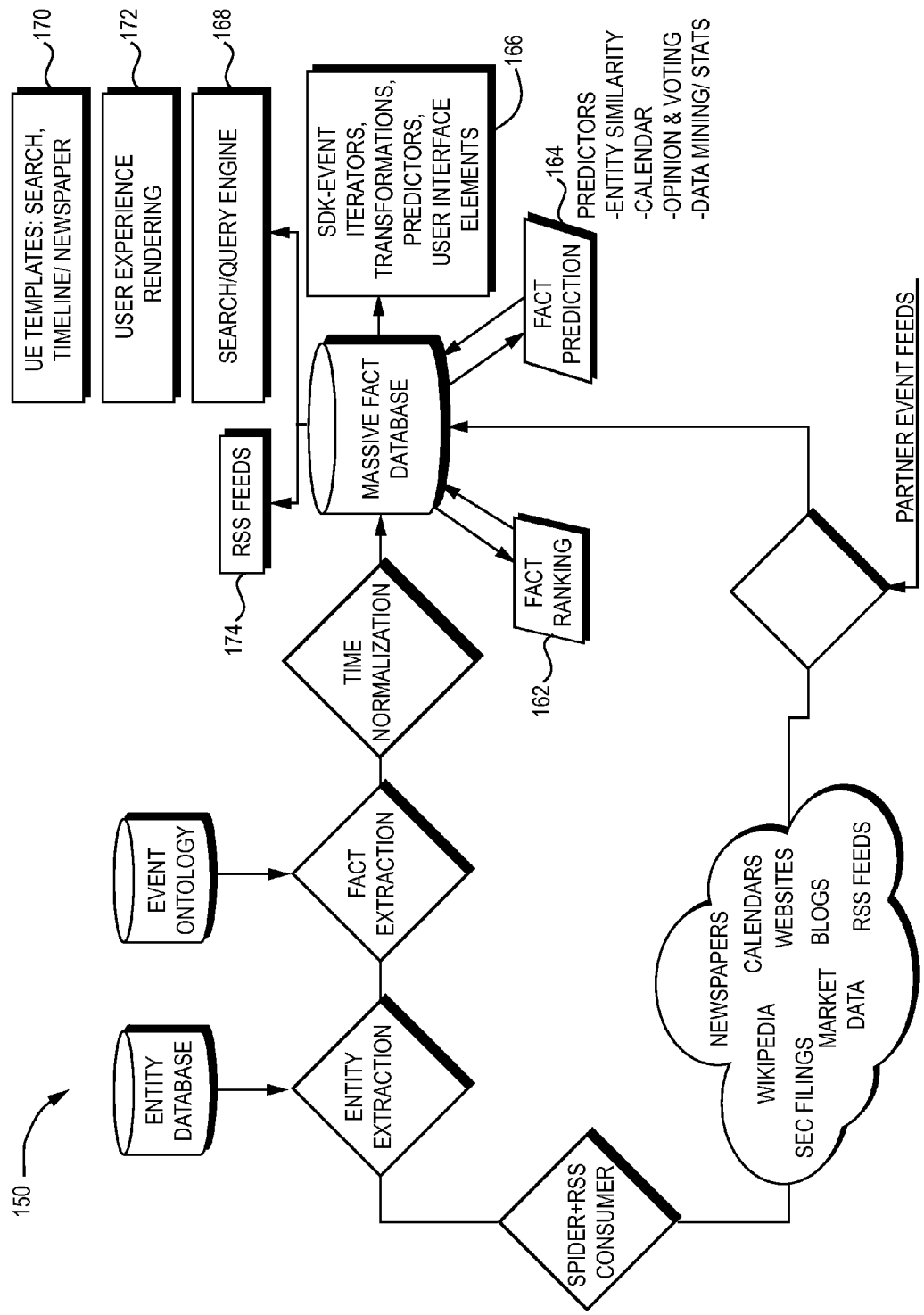
FIG. 4 is a conceptual data diagram for use with systems according to the invention.

Referring to FIG. 4, in one embodiment of a system 150, information sources are accessed through spiders and RSS subscriptions. An entity extraction module 152 and a fact extraction module 154 extract entity and fact information based on an entity database 154 and fact ontology storage 156. The resulting information is time-normalized (158) and stored in a large-scale fact database 160. This database can be partitioned based on the fact ontology. Fact ranking and fact prediction processes 162, 164 can be used to augment the database with ranking and predictive information. Entities can include a wide variety of subjects, such as people, places, or timepoints.

A software development kit 166 allows developers to iterate facts, perform transformations and predictions, and implement user interface elements. The system can also provide a search/query engine 168 as well as user experience templates 170 and rendering 172 to produce different types of interfaces, such as search, timeline, and newspaper interfaces. RSS feeds 174 can also be generated from the database.

The system described above has been implemented in connection with stored special-purpose software program instructions running on a general-purpose computer platform, but it could also be implemented in whole or in part using special-purpose hardware. And while the system can be broken into the series of modules and steps shown in the various figures for illustration purposes, one of ordinary skill in the art would recognize that it is also possible to combine them and/or split them differently to achieve a different breakdown.

Fact ranking is of vital importance to give a good user experience both for monitoring/alert and search applications. A ranking approach based on six concepts is proposed, and several ways of computing the event ranking are suggested.

Figure 5:
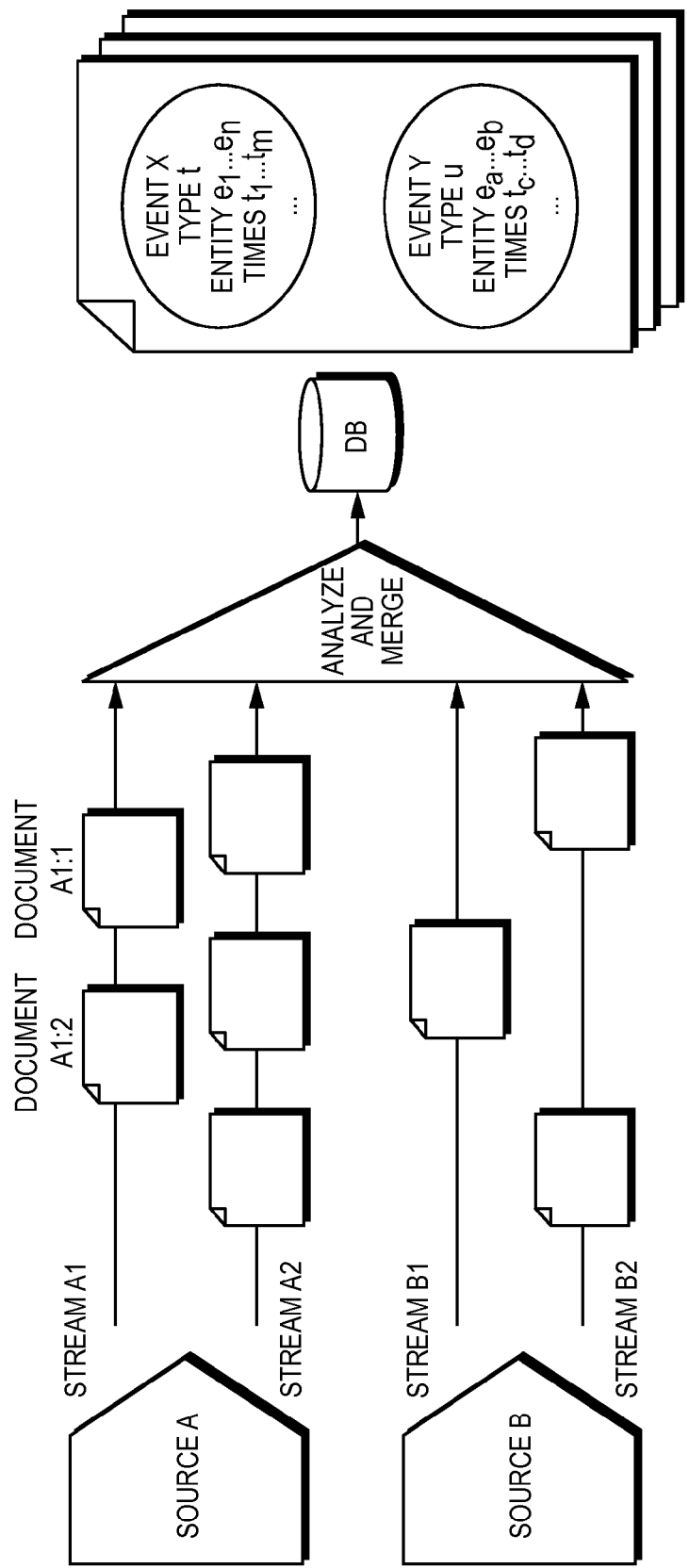
FIG. 5 is a high-level diagram illustrating the use of an information model to discover events in documents.

Referring to FIG. 5, the system can use an information model where facts are discovered in documents. Documents are delivered to the system through media streams (e.g. RSS feeds, blogs, or other means) from various sources. From each document, a number of entities and facts are extracted, and stored in a database. FIG. 5 illustrates this at a high level.

Figure 6:
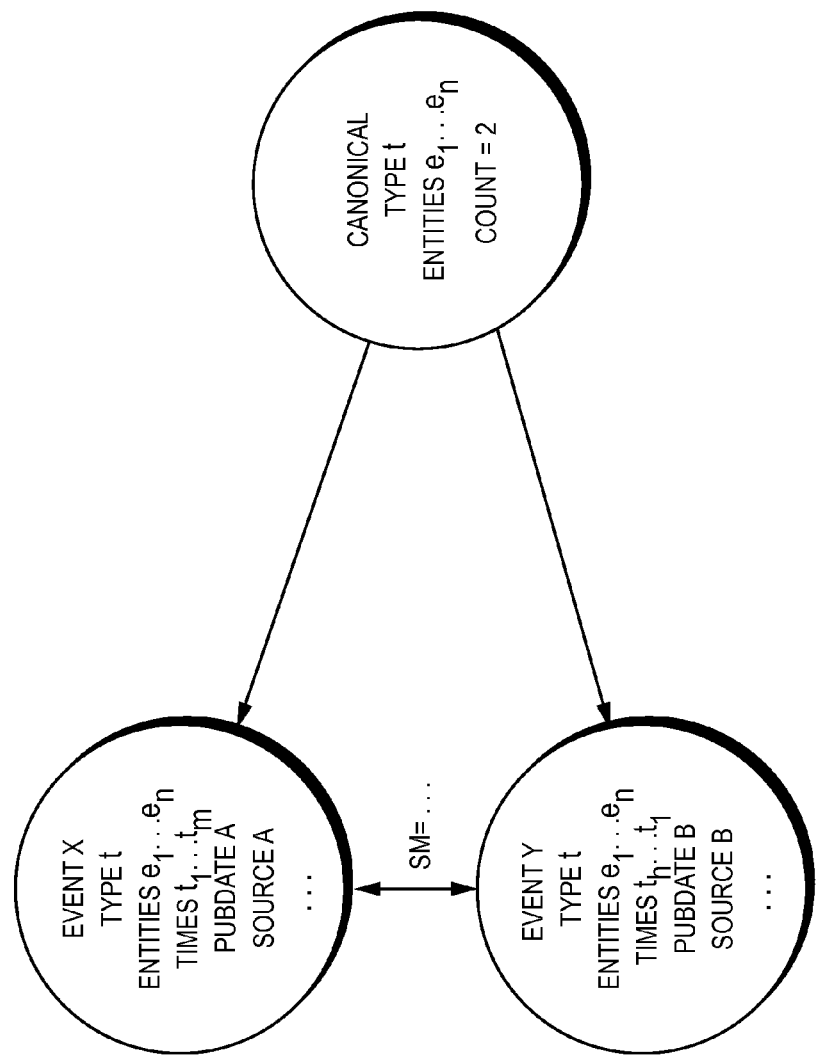
FIG. 6 is a diagram illustrating the relationship between canonical events and event descriptors.

Facts (e.g., events) detected in documents are of course descriptions of "real world" facts; even though they are therefore "fact descriptors", they are still referred to as "facts". These event descriptors can be thought of as being related with a corresponding "canonical fact," as shown in FIG. 6.

In the model, a canonical fact has just a fact type and a set of entities, whereas a fact (or fact descriptor) has additional information such as publication date, source, etc.

The entities take different roles, e.g. for an acquisition event the two roles are "Company_Acquirer" and "Company_BeingAcquired" (these are Calais event types). All fact descriptors of the same type and with the same entities (in the corresponding roles) are linked to the canonical fact.

Different existing entity extractors can be used, such as Calais or Basis. These can exhibit some shortcomings, however, in that they can have several entity IDs for what should be the same entity—for example, "Microsoft"/"Microsoft Corp"/"MicrosoftCorp." and "IBM"/"International Business Machines". Even if and when disambiguation is improved, the system will keep its own identities, to guard from future changes in the entity extractor. In the system's ontology pointers are kept to the different entity extractor identities (hash values). In addition, pointers are kept to other information about the tsup_entity. The tsup entities and the mapping to entities are implemented with two tables: tsup_entity and tsup_extractor_entity_map.

tsup_entity:

| tsup_entity id | U53454353434534454456457568564 |
|---|---|
| Name | IBM |
| Type | Company |
| URL | www.ibm.com |
| Wikipedia | http://en.wikipedia.org/wiki/IBM |
| Ticker | NYSE:IBM |
| Total count | 123 |
| Derivative 2 hours | 15 |
| Derivative 48 hours | 40 |
| Total Rank | 0.345 |
| Derivative 2 hours rank | 0.8 |
| Derivative 48 hours rank | 0.2 |
| Aggregate rank | 0.524166667 | tsup_extractor_entity_map:

| tsup_entity id | U53454353434534454456457568564 |
|---|---|
| extractor_entity id (IBM) | http://d.opencalais.com/comphash-1/7c375e93-de13-3f56-a42d-add43142d9d1 |
| tsup_entity id | U53454353434534454456457568564 |
| extractor_entity id (International Business Machines) | http://d.opencalais.com/comphash-1/6869b162-b816-3d1b-9711-d2273229c4fa |

NOTE: first (master) associated extractor entity_id is used as the tsup_entity id.

The data set is built incrementally as new entities are detected in the output from the entity extractor. Initially, the data set can be populated from the Entity table in the database, and adding to the tsup_extractor_entity_map table using the equivs file (/home/truve/equivs) with the following format (alias; master):
AT&T Inc; AT&T
Alberto-Culver Co; Alberto-Culver
Alitalia SpA; Alitalia
Altria Group Inc; Altria
Amazon.com Inc; Amazon
American International Group Inc; AIG
American International Group; AIG
Arcelor Mittal; Arcelor
ArcelorMittal; Arcelor
BG Group Plc; BG Group
Bank of America Corp; Bank of America
Blackstone Group; Blackstone
Blackstone Group LP; Blackstone
Six concepts are used to perform fact ranking:
  Entity Ranking (ER)
    Each entity is given a ranking depending on either how "important" it is (indicated e.g. by how common it is in the database) or on the derivative of that importance (i.e. if it is has recently become more common).
    As a complement, the entity can be ranked within the entity's category—this makes more sense since it is hard to compare the importance of "New York" and "Britney Spears".
    Entities can also be ranked according to more sophisticated measures, e.g. based on the sentiment/attitude towards an entity, and how that changes.
    An entity can also be boosted in ranking if it co-occurs with many other high-ranking entities (e.g. some previously unknown person meeting a lot of famous persons in Davos).

Source Credibility (SC)

Each data source is given a credibility ranking; this ranking is domain dependant, e.g. a source can have high credibility in the finance domain but not in the technical domain.

For each type of fact, such as financial, political, sports etc. the system retains and keeps up to date a list of sources that are deemed proxies for human interpretation of source credibility.

A manual ranking is performed on 100 degree scale of the most common sources in the dataset. (Here, in contrast to ER, quantity is not the same as quality!). Future implementations will include feedback mechanisms to re-evaluate this ranking.

Source Credibility can also be based on click-throughs, i.e. with what (relative) frequency users actually follow links to a certain source.

For the blogosphere, rankings such as Spinn3r's ranking measures (based on inbound links, etc.) can be used in addition to a more subjective ranking of a source's credibility.

In addition to source credibility, stream credibility can also be used (since a source such as WSJ will have different credibility for different RSS feeds Initial Event Ranking (IER)

Each fact is given a ranking based on its source credibility and the ranking of the included entities.

The IER is not static, but needs to be recalculated as source credibility can change (although slowly!) and entity ranking can change quite quickly.

Proximity Measure (PM)

Each pair of facts has a proximity measure describing how "closely" they are being mentioned together. An initial approximation is that two facts have PM=1 if they occur in the same document, and otherwise PM=0. An fact always has proximity measure 1 to itself.

Other properties that yield a high proximity measure is co-location and closeness (or overlap) in time; however, it is important to keep PM and SM separate. Closeness in time and space needs to be computed using a hierarchy of spacial entities and time intervals.

Proximity is transitive, but with a fading factor. For example, if PM(a,b)=0.5 and PM(b,c)=0.3 then PM(a,c)=0.15F, where F is a Fading Factor.

For practical reasons, a threshold T is generally needed, such that if PM<T then PM is handled as 0 (thus breaking the "transitive chain" of proximity).

Similarity Measure (SM)

Each pair of facts has a similarity measure describing how similar they are. The similarity measure is calculated based on if the two facts are of the same type, if they relate to the same entities and if they are close/overlapping in time. A fact always has similarity measure 1 to itself.

As for PM, similarity has to be computed by taking into account entity hierarchies. For example, Stockholm is more similar to Göteborg than to New York, since Stockholm and Göteborg are both in Sweden. This can become tricky—for example, Malmö is more similar to Köpenhamn than to Stockholm because Köpenhamn is closer—but in a different country.

Derived Event Ranking (DER)

The derived ranking of an fact is calculated based on its Initial Event Ranking and on the ranking of all other facts, using the Proximity and Similarity Measure. Initial Event Ranking is determined as follows.

Initial Event Ranking

For a fact E with source S and included entities $e_1 \ldots e_n$, and with the source credibility function c, and entity ranking function r, the following holds:

$$IER(E)=f(c(S),g(r(e_1) \ldots r(e_n)))$$

The functions c, f and g all have the value range $0 \ldots 1$.

There are many ways to choose the functions f and g; one choice is to multiply the source credibility with the aggregated entity rankings, i.e. $f(x,y)=x*y$. The entity weight aggregation function g can be chosen e.g. as the maximum ranking of any included entity, or the mean ranking. Other aggregation functions are of course also possible.

Derived Event Ranking

The DER is calculated through an iterative function, with initial values being given by:

$$DER_0(e)=IER(e)$$

The simplest DER function used, $DER^A$, just "boosts" events if they are similar to other events with higher ranking (or, more precisely, higher ranking times similarity): $DER^A_{(n+1)}(e)$=FOR ALL EVENTS i=1 $\ldots$ max: SUM(DE-$R^A_n(e_i)*SM(e,e_i))/m$ WHERE m=number of events (1 $\ldots$ max) for which $SM(e,e_i)>0$ and $DER^A_n(e)<DER^A_n(e_i)*SM(e,e_i)$

EXAMPLE

Assuming there are two documents, document 1 with fact A and B and document 2 with facts C and D. The facts have the following IER:

$$IER(A)=4.0$$

$$IER(B)=2.0$$

$$IER(C)=4.0$$

$$IER(D)=1.0$$

Furthermore, assume that there is one SM>0 (apart from entities being fully similar to themselves!)

$$SM(B,C)=0.8$$

Figure 7:
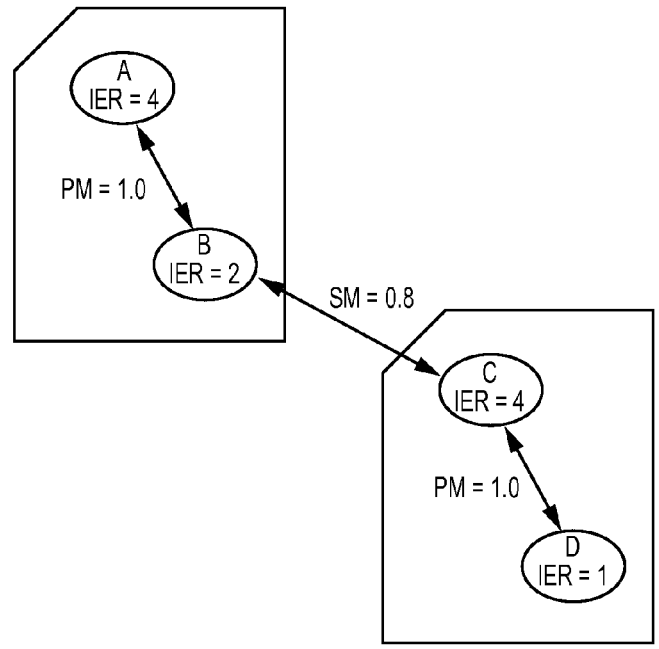
FIG. 7 is a diagram graphically illustrating an example of the calculation of derived event ranking with two highly similar documents.

This is a high degree of similarity—for example the same event type and same entities but different times. This example is shown graphically in FIG. 7.

The $DER^A$ function converges after 29 iterations with the following values:

$$DER^A_{29}(A)=4.0$$

$$DER^A_{29}(B)=3.2$$

$$DER^A_{29}(C)=4.0$$

$$DER^A_{29}(D)=1.0$$

So, event B has been given a higher ranking than its IER, and all other rankings remain unchanged.

Figure 8:
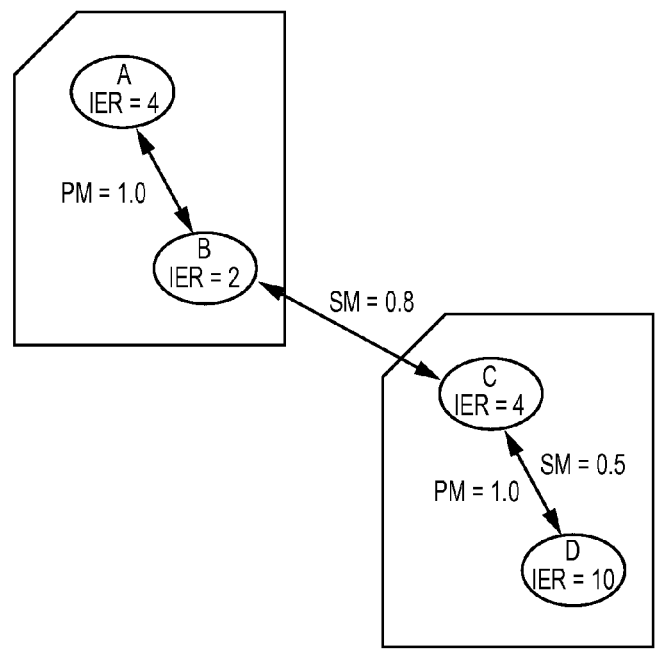
FIG. 8 is a diagram graphically illustrating a more complex example.

Here is a slightly more complicated example, shown graphically in FIG. 8:

$$IER(A)=4.0$$

$$IER(B)=2.0$$

$$IER(C)=4.0$$

$$IER(D)=10.0$$

$$SM(B,C)=0.8$$

$$SM(C,D)=0.5$$

In this case, the iterative method converges after 34 iterations with the following result:

$$DER^A_{34}(A)=4.0$$

$$DER^A_{34}(B)=4.0$$

$$DER^A_{34}(C)=5.0$$

$$DER^A_{34}(D)=10.0$$

So, both B and C have now been boosted, although C has not been boosted so much since the similarity to the highly ranked D is not so big.

Proof Sketch that $DER^A$ Always Converges

The $DER^A$ iterative method always converges for the following reasons:

1. There is always one or more events with a $DER^A$ value higher than all others. These will never be boosted by $DER^A$
2. For an event e the $DER^A$ value will converge when its $DER^A$ value is greater than or equal to $DER^A_n(e_j)*SM(e,e_j)$ for all its neighbours $e_j$. Since $DER^A_{n+1}(e)>=DER^A_n(e)$ for all n, then the iterative method will converge.

Note: the number of iterations needed for convergence is dependent on the maximum diameter of the graph where events are nodes and SM-relationships edges.

Using Both Similarity And Proximity—The $DER^B$ Method

An alternative method is to use both similarity and proximity to compute the derived ranking.

Counting Canonical Facts—The $DER^C$ Method

The $DER^A$ method uses the fact similarity measure SM to allow similar facts to influence each other's ranking. Taking this one step further, a system can start counting the number of occurrences of each "canonical fact". As an example, there will be many facts relating to the possible Microsoft acquisition of Yahoo, with different times, sources and other differences, but all relating to the "canonical" fact:

EVENT_TYPE=ACQUISITION
ACQUIRER=MICROSOFT
ACQUIREE=YAHOO

A system can thus count the number of events relating to this canonical fact, and use the canonical fact count as a complementary way of ranking events.

Other Ranking Methods

The ranking of a document in which a fact occurs is also a useful measure. Using the Google PageRank of the document is the most straightforward way to do this.

Flowchart for Event Ranking

In summary, referring to FIG. 8, a method has been presented for calculating an initial event ranking, IER, and several for calculating derived event rankings, DER.

The IER is calculated when a fact is added to the database, using semi-static information from the database about entity ranking, source credibility and potentially additional information (document page ranking would be one example). The IER for a fact can be recomputed at any time, using updated input data.

The DER methods iteratively update the DER value (or values) of each fact, using the IER and DER values of all other facts to which it relates.

Illustrative Implementation Outline
Initial tsup_entity Table
Built initial tsup_entity table based on entity table and equivalence file.
Adding to the tsup_entity Table
When a new extractor_entity is found (not already in the tsup_entity table) create a new tsup_entity.
Logging
Every N minutes (currently, N=30):
    Acquire current time (CT)
    For each tsup_entity:
        Compute the current tsup_entity total count, i.e. the total number of occurrences of all related extractor_entities. Add this to the queue of tsup_entity counts, tagged with CT. (NOTE: this can be "infinite" or of a maximal size equivalent to the maximal window size for computing derivatives that it is desired to allow (see below).
tsup_entity Ranking
    For each tsup_entity:
        Compute tsup_entity derivates based on count changes over different window sizes, e.g. 2, 48 hours=when N=30 minutes 4 and 96 steps back in the total count queue.
        NOTE: several different difference windows could be used.
    For each entity category (Company, Person, Country . . . ):
    Find maximal total count and derivative 2/48 in category.
    For each tsup_entity:
        Compute normalized ranks (divide by max in category) for total count and each derivative.
        Compute aggregate tsup_entity ranking from normalized ranks: aggregate_rank=(total_rank+2*deriv48_rank+3*deriv2_rank)/6
        Store all four rank values for entity
        NOTE: this is just one possible aggregation function—different ones can be used.
        NOTE: the ranking could alternatively be recalculated each time a new entity reference is detected.
Initial Event Ranking
For each fact:
    Find source_credibility sc
    Find tsup_entity aggregate_rank $er_1 \ldots er_n$ of each entity related to the event
    Compute two IER values as:

$$IER\_mean=sc*\text{sum}(er_1 \ldots er_n)/n$$

$$IER\_max=sc*\max(er_1 \ldots er_n)$$

Store these two rank values for the event
    NOTE: other functions might be used to calculate other IER values.
Derived Event Ranking
    As described in the paragraph above.

Example 1

Ahmad Shah Massoud was the head of the Northern Alliance in Afghanistan. He was killed on Sep. 9, 2001. A search in the event database on September 9th would have classified this to be a relatively unimportant event, and this would have been in accord with general sentiment about its importance. 48 hours later, however, it was deemed to be an extremely important event.

This change in importance resulted from reports of Massoud's killing being published on or just around Sep. 11, 2001 in high ranked sources, along with/co-occurrence in documents with another very key event—the 9/11 terrorist attacks (that for various reasons have been ranked high). Accordingly, 48 hours later the event's generally agreed-upon importance and likewise its ranking in our system, would be high.

While the temporal co-occurrence of the two events would no doubt be sufficient by itself to greatly increase the ranking of the Massoud story, the following factors could also have an effect:

1) Its importance within its category (e.g., Afghan politics or Middle East politics) was high, and that category became more important after 9/11.
2) Sentiment toward the Northern Alliance may have changed after 9/11.
3) There may have been a relatively close proximity measure between the 9/11 attacks and Massoud's name in the co-occurring documents.
4) The assassination and the 9/11 attacks are similar types of events (terrorist attacks involving explosives).
5) The two events were both involved the same lower-level hierarchical entity, "Afghanistan," rather than higher-level entities, such as "Middle East."

It is important to distinguish between publication times for a fact and the occurrence time of the fact. Articles that predict an impending bankruptcy, for example, may describe its expected date with more and more precision as time progresses. Later-published articles can therefore be weighted more heavily in predicting the date of a fact. Trends about the expected time of occurrence of a fact can even be extracted from the evolution of its prediction in articles over time. And these trends can point to a more accurate prediction of the date of occurrence of the fact.

Figure 9:
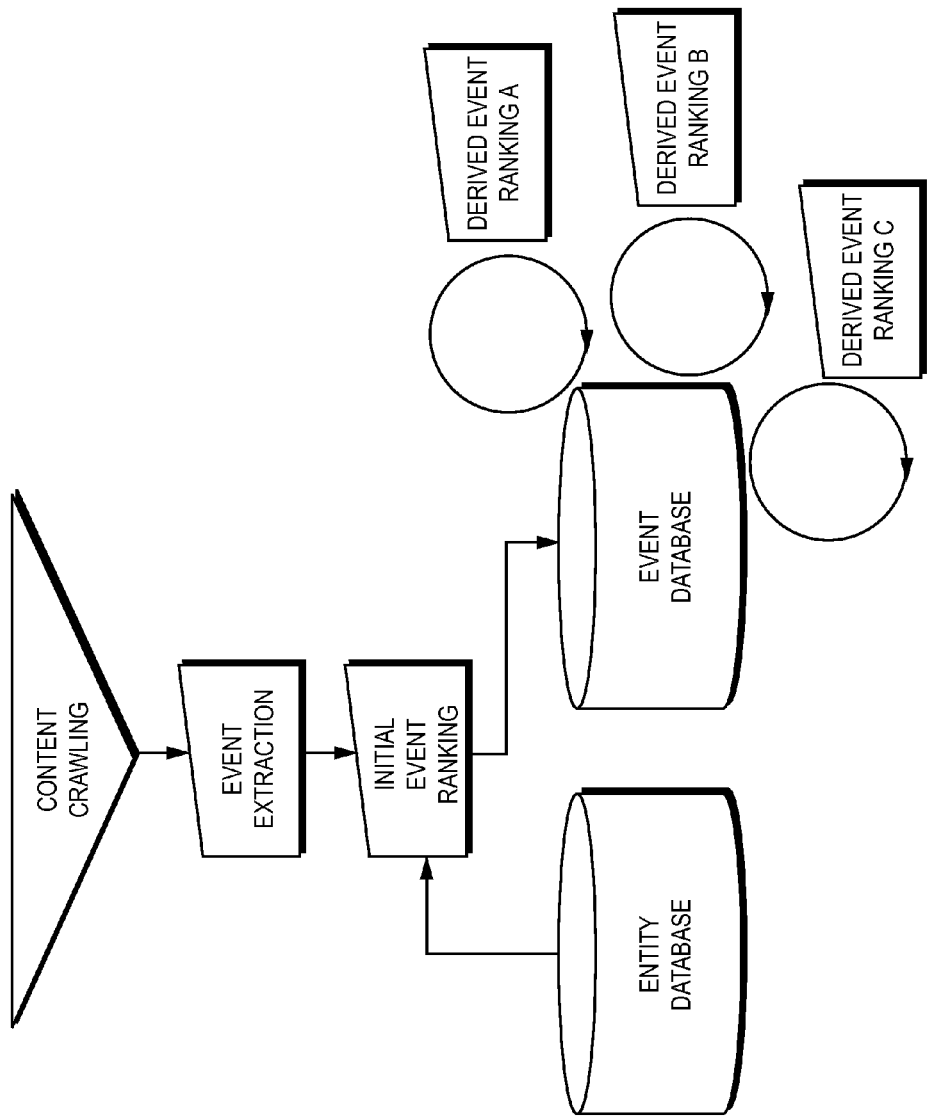
FIG. 9 is a flowchart illustrating event ranking.
Figure 10:
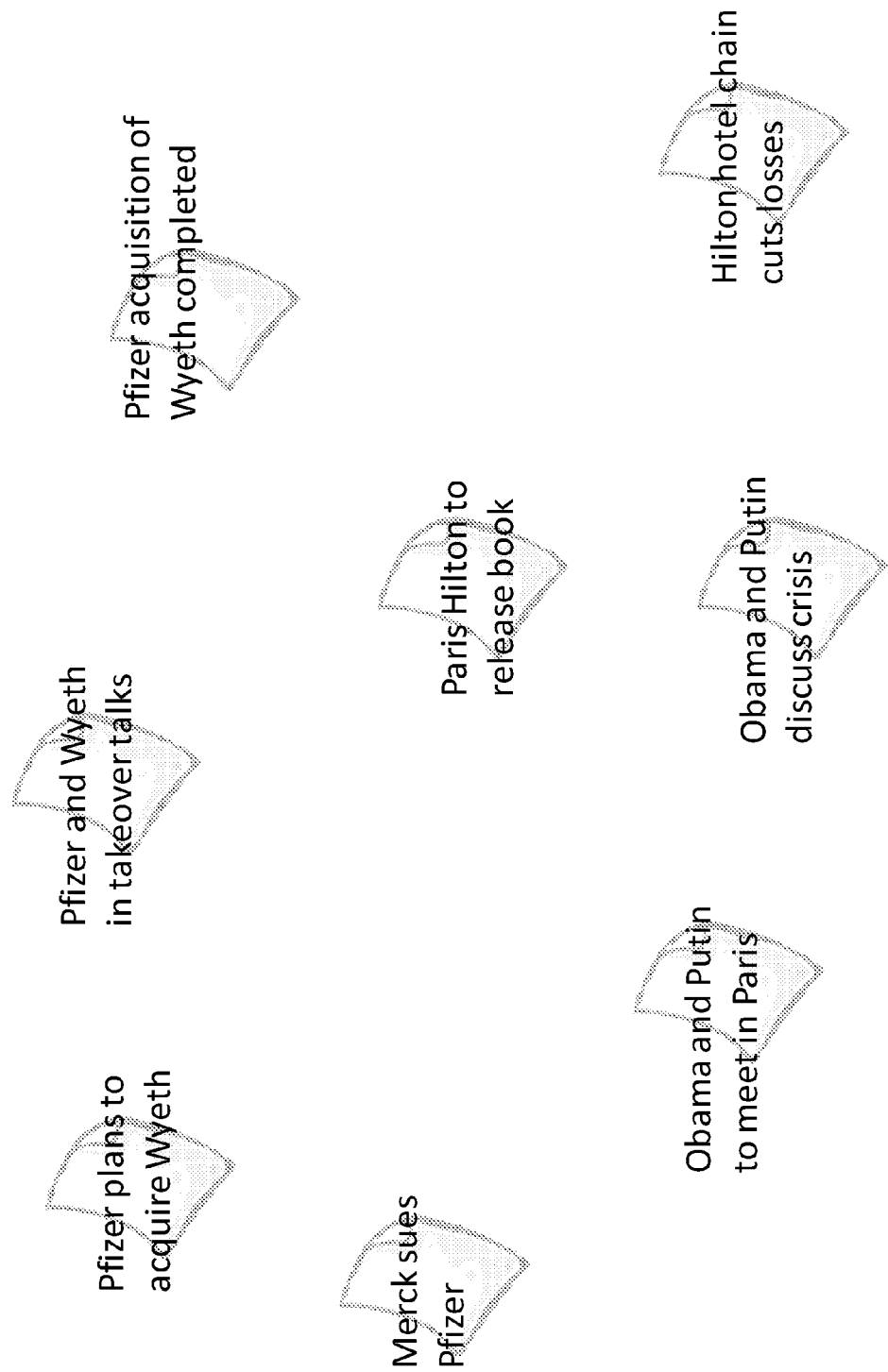
FIG. 10 is a diagram illustrating document access for a user presentation of data.
Figure 11:
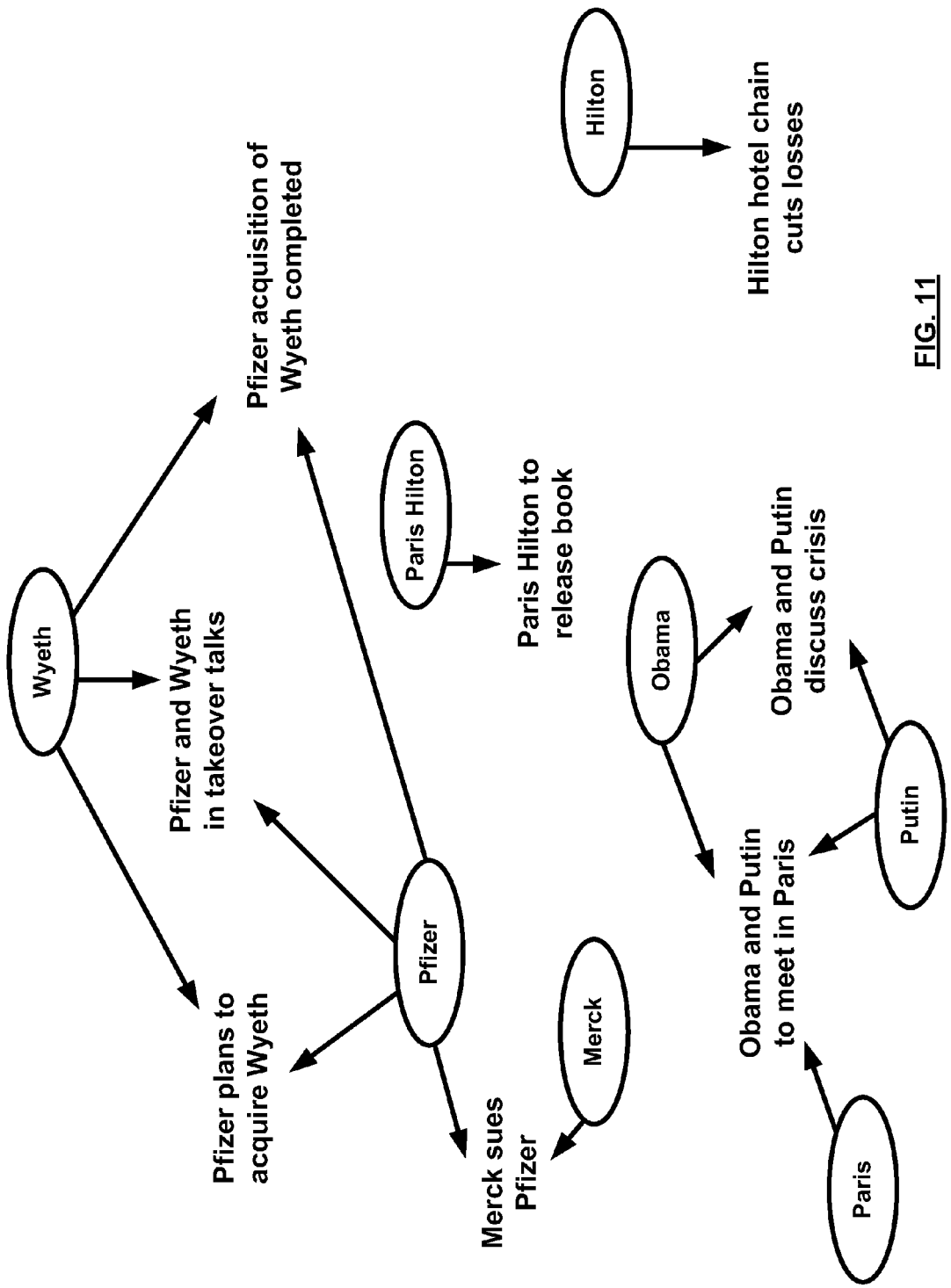
FIG. 11 is a diagram illustrating entity extraction the user presentation of data.
Figure 12:
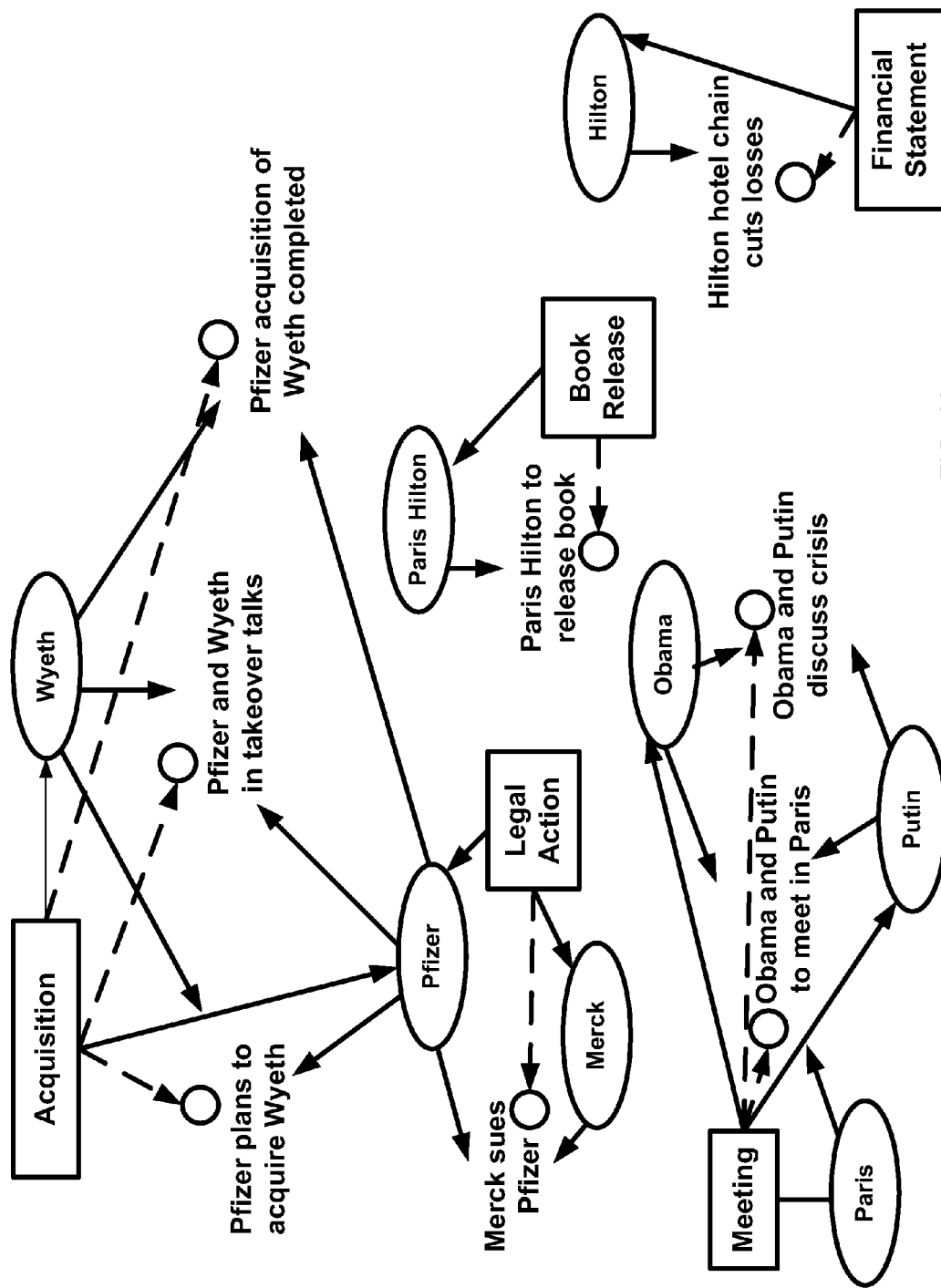
FIG. 12 is a diagram illustrating a social network-type representation of data for presentation to a user.

Referring to FIGS. 9-11, the output of the system can be presented to the user in a variety of formats, such as a social-network graph. In this example, documents are first accessed (FIG. 10). Entities relating to these documents are then extracted (FIG. 11). The relationship between canonical entries and fact descriptors can then be mapped out for the user (FIG. 12).

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A wide area network fact information service method, including:
   storing a plurality of canonical fact entries in different subject matter domains, wherein the canonical fact entries each correspond to an occurrence and each include an occurrence date for that occurrence,
   storing one or more fact descriptor entries for each of the canonical fact entries,
   ranking the canonical fact entries in each subject matter domain relative to each other based on the descriptor entries, the occurrence dates, and on at least one ranking measure for that subject matter domain, and
   wherein at least some of the occurrence dates are extracted from content meaning in one or more textual sources about the occurrence.

2. The method of claim 1 wherein the step of ranking is a continuous process that recalculates the rank of canonical fact entries based on new descriptor entries.

3. The method of claim 1 wherein the step of ranking is an iterative process that recalculates the rank of canonical fact entries based on new descriptor entries.

4. The method of claim 1 wherein the step of ranking is a parallel process that recalculates the rank of canonical fact entries based on new descriptor entries.

5. The method of claim 1 wherein the ranking is based on a predetermined ranking for entities associated with the canonical fact entries.

6. The method of claim 5 wherein the entity ranking is based on a number of descriptor entries.

7. The method of claim 5 wherein the entity ranking is based on a number of descriptor entries within a category.

8. The method of claim 5 wherein the entity ranking is based on a sentiment/attitude value.

9. The method of claim 5 wherein the entity ranking is based on co-occurrence with other facts and their rankings.

10. The method of claim 1 wherein the ranking is based on a ranking of source credibility for data source providers associated with the descriptor entries.

11. The method of claim 10 wherein a same source provider can have different credibility values for different sources that it provides.

12. The method of claim 10 wherein a same source provider can have different credibility values for different categories of sources that it provides.

13. The method of claim 10 wherein the credibility ranking is based on at least one user interest measure.

14. The method of claim 1 wherein the ranking is based on a proximity measure for the descriptor entries.

15. The method of claim 14 wherein the proximity measure is a temporal proximity measure.

16. The method of claim 14 wherein proximity measures are combined using a fading factor.

17. The method of claim 1 wherein the ranking is based on a plurality of similarity measures that express a similarity between the canonical fact entries and/or fact descriptor entries.

18. The method of claim 17 wherein the similarity measures relate to fact type and temporal overlap.

19. The method of claim 17 wherein the similarity measures operate according to a hierarchy.

20. The method of claim 1 wherein the ranking is based on publication times.

21. A wide area network fact information service system, including:
   canonical fact entry storage, for storing a plurality of canonical fact entries in different subject matter domains, wherein the canonical fact entries each correspond to an occurrence and each include an occurrence date for that occurrence, and wherein at least some of the occurrence dates are extracted from content meaning in one or more textual sources about the occurrence,
   fact descriptor entry storage for storing one or more fact descriptor entries for each of the canonical fact entries, and
   a ranker for ranking the canonical fact entries in each subject matter domain relative to each other based on the descriptor entries, the occurrence dates, and on at least one ranking measure for that subject matter domain.

22. A wide area network fact information service system, including:
   means for storing a plurality of canonical fact entries in different subject matter domains, wherein the canonical fact entries each correspond to an occurrence and each include an occurrence date for that occurrence, and wherein at least some of the occurrence dates are extracted from content meaning in one or more textual sources about the occurrence, means for storing one or more fact descriptor entries for each of the canonical fact entries, and means for ranking the canonical fact entries in each subject matter domain relative to each other based on the descriptor entries, the occurrence dates, and on at least one ranking measure for that subject matter domain.

* * * * *